United States Patent [19]

Kapoor et al.

[11] 3,950,559

[45] Apr. 13, 1976

[54] METHOD FOR DELAYING RIPENING OF HARVESTED BANANAS

[75] Inventors: Jatinder Kumar Kapoor, Liphook, England; John Norman Turner, Govilon, Wales

[73] Assignee: Imperial Chemical Industries Limited, London, England

[22] Filed: Aug. 15, 1974

[21] Appl. No.: 497,749

[30] Foreign Application Priority Data

Aug. 24, 1973 United Kingdom............... 40190/73

[52] U.S. Cl................................. 426/335; 426/321
[51] Int. Cl.²........................ A23L 3/34; A23B 7/14
[58] Field of Search............................ 426/321, 335

[56] References Cited

UNITED STATES PATENTS 3,037,867   6/1962   Daudin et al.................... 426/335 X

OTHER PUBLICATIONS

Vendrell, *Aust. J. Biol. Sci.*, 1970, Vol. 23 pp. 553–559 Acceleration and Delay of Ripening in Banana Fruit Tissue by Gibberellin Acid.

*Primary Examiner*—James R. Hoffman
*Attorney, Agent, or Firm*—Cushman, Darby & Cushman

[57]   ABSTRACT

Post harvest treatment of bananas with gibberellins $A_4/A_7$ optionally mixed with a fungicide, in amounts sufficient to delay ripening.

8 Claims, No Drawings

METHOD FOR DELAYING RIPENING OF HARVESTED BANANAS

This specification relates to the treatment of fruit and more particularly to the treatment of bananas.

Bananas are grown, for the most part, in Africa, Central America and the Caribbean. A large proportion of the harvest is transported by ship to the USA and Europe. Bananas are cut from the tree when green and are shipped in the same state. During the shipment they may ripen, following which they may begin to rot. To avoid losses due to rotting on longer voyages, or when voyages are delayed, it is often necessary to cut the bananas from the tree before they are fully grown. This however causes loss to the grower, who sells his crop by weight.

According to the present invention we provide a method of improving the storage characteristics of bananas which comprises treating harvested bananas with gibberellin $A_4$ or gibberellin $A_7$ in an amount sufficient substantially to delay the ripening thereof.

The gibberellins are a group of substances derived from culture of the fungus *Gibberella fujikori*. A description of these substances is given by J F Grove in "The Gibberellins", Quarterly Reviews, 1961, 15, pages 56 to 71 (published by the Chemical Society London). The gibberellins have plant growth regulating properties. The most widely used gibberellin is gibberellin $A_3$, also known as gibberellic acid, which is disclosed in U.K. Pat. No. 783,611. This compound has been widely used for speeding the germination of malting barley, and also to some extent in agriculture to treat diverse crops, for example pears, grapes, rhubarb, oil palms, oranges, water cress and artichokes to obtain a wide variety of commercially useful effects.

Gibberellic acid ($A_3$) can be used to prevent ripening of bananas, but a relatively high rate of application is necessary. The treatment therefore is undesirably expensive, because the gibberellin has to be made by highly expensive fermentation methods. Most surprisingly, we have discovered that gibberellins $A_4$ and $A_7$ are very substantially more effective than gibberellin $A_3$ and may for example in some circumstances give better results than $A_3$ at 1/10th the application rate, or even lower. Either gibberellin $A_4$ or gibberellin $A_7$ gives this effect. We generally prefer to use a mixture of the two gibberellins, since they are generally produced commercially as a mixture; separating them is expensive and unnecessary.

According to the invention bananas are treated with gibberellin $A_4$ or gibberellin $A_7$ after harvesting. Such treatment usually takes place within 3 days of harvest, and preferably within 24 hours, though it may be partially effective if delayed up to two or three weeks. Treatment typically takes the form of drenching the fruit in an aqueous spray, dip or cascade which may contain from 0.1 to 30 and preferably from 1 – 10 parts per million of the gibberellin. The gibberellins may be in the form of the free acid, or water-soluble salts or other derivatives thereof; alternatively they may be dispersed in the aqueous treatment medium by means of surfactants. The use of surfactants in the water or dip is in any case desirable to improve the coverage and penetration of the ingredient in bananas. Where a dipping process is used, the bananas need only be dipped briefly, e.g. for a few seconds. The water must be substantially free of chlorine, since this reacts with gibberellins and deactivates them.

Treatment will normally be proceeded by washing. Treatment according to the invention may be combined with treatment with a post-harvest fungicide effective in combating fruit rots, e.g. thiabendazole. Accordingly compositions comprising gibberellins $A_4$ or $A_7$ and a fungicide effective in combating fruit rots are a further feature of our invention. The ratio of gibberellin to fungicide is generally between 1:10 and 1:100 by weight.

In recent years a valuable class of fungicides has come to light, based on esters of benzimidazole-2-carbamic acid. Esters of 2-benzimidazole carbamic acid are disclosed to be fungicides in U.S. Pat. No. 3,010,968. The esters themselves however have not yet found widespread use. There are however a number of extremely important wide-spectrum systemic fungicides now commercially available which owe their activity to conversion to such esters. Possibly this conversion takes place mainly inside treated plants, so that the superior effectiveness of such products may be due to the greater ease with which they are taken up into plants. The best known of such fungicides is benomyl (methyl N(1(butylcarbamoyl)-2-benzimidazole) carbamate). The corresponding $C_1 - C_6$ alkylcarbamoyl compounds, in which the N-methyl group may also be replaced by a $C_2 - C_4$ alkyl group, are also convertible to esters of benzimidazole-2-carbamic acid. So also are thiophanate (1,2-di-(3-ethoxycarbenzyl-2-thioureido) benzene) and its $C_1 - C_6$ alkyl homologues. Reference to such conversion is to be found in a communication by A A Selling et al, in Chemistry and Industry, 1970, at pages 1625 – 1626, and an article by Kirby in PANS, 18, March 1972, pages 1 – 33 at pages 2 – 3. Other compounds which are precursors of benzimidazole 2-carbamic acid esters include $C_1 - C_4$ alkyl-N-(1(methylthioethylcarbamoyl)-2-benzimidazole) carbamates, e.g. the methyl ester (common name mecarbinzid); and 3($C_1 - C_4$ alkoxy) carbonylamino-2,1, 4-benzothiadiazines. All these compounds are effective in combating fruit rots, and are preferred fungicides for use in the compositions of our invention. Particularly preferred fungicides are benomyl and thiabendazole. Polymeric hexamethylene biguanide salts (e.g. the chloride) are also useful.

In favourable circumstances by the process of the present invention it may prove possible to delay ripening by a period of one week. This extra week may be in a vareity of ways:

a week's extra growth may be obtained on the banana tree;

transport and distribution may be delayed or extended for a period of a week;

harvesting schedules may be arranged more flexibly.

The process of the present invention may also reduce loss of fruit due to rotting in transit and also during ripening after transit.

The following Examples illustrate the invention without limiting it in any way.

EXAMPLE 1

Bananas (varieties Lacatan and Valery) were harvested in the usual green condition and submitted the same day to various treatments as described below. In each treatment duplicate five finger hands were used, each treatment being replicated 5 times (i.e. 50 fruit per treatment in all). Each hand was dipped for 3 minutes into water containing one or more of the following additives: $A_3$; a 50/50 mixture of $A_4$ and $A_7$; benomyl. The treated hands were stored for 8 weeks in separate baskets at a temperature of 15°C. Fruits were examined twice a week and removed when at a stage of marketable ripeness. Results, in terms of percent of fruits still green and healthy, after 22 and 42 days storage, are shown in Table I below.

TABLE 1

| Treatment No. | Additive | Additive p.p.m. | Benomyl p.p.m. | % Green Fruit 22 Days | 42 Days |
|---|---|---|---|---|---|
| 1 | None (control) | — | — | 92 | 78 |
| 2 | None | — | 250 | 91 | 79 |
| 3 | $A_3$ | 100 | — | 91 | 84 |
| 4 | $A_3$ | 100 | 250 | 99 | 91 |
| 5 | $A_4/A_7$ | 10 | — | 100 | 93 |
| 6 | $A_4/A_7$ | 10 | 250 | 100 | 99 |

These results demonstrate the superior performance of $A_4/A_7$ to $A_3$ at a tenfold lower rate, as well as the further improvement obtainable by the use of benomyl.

A commercial formulation of benomyl incorporating a wetting agent was used; to solutions not containing benomyl, 0.025% of the wetting agent "Agral 90", a nonyl phenol/ethylene oxide condensate, was added. $A_3$ was used in the form of its water-soluble sodium salt; the mixture of $A_4/A_7$ (containing approximately 50% by weight of each) was pre-dissolved in a small quantity of ethanol.

EXAMPLE 2

Bananas of the varieties Lacatan and Valery were picked in Jamaica and shipped to Southampton. There they were treated by the method of Example 1, 10 – 12 days after harvest, and stored at 13°C and approximately 89% humidity. Results are shown in Table 2 below.

TABLE 2

| Treatment No. | Gibberellin (p.p.m.) | Benemyl (p.p.m.) | % Green Fruit - Days after Treatment | | | | | | |
|---|---|---|---|---|---|---|---|---|---|
| | | | 14 | 21 | 28 | 35 | 42 | 49 | 56 |
| 1 | — | — | 68 | 60 | 50 | 30 | 6 | 0 | |
| 2 | — | 250 | | 72 | 48 | 36 | 12 | 8 | 0 |
| 3 | $A_4/A_7$ (10) | 250 | | 90 | 90 | 80 | 50 | 36 | 14 |
| 4 | $A_7$ (10) | — | | 96 | 84 | 60 | 38 | 22 | 0 |
| 5 | $A_4$ (10) | — | | 92 | 62 | 30 | 2 | 0 | |

This Example shows that both components of the $A_4/A_7$ mixture are active, but that $A_7$ is the better of the two.

EXAMPLE 3

Bananas of the varieties Lacatan and Valery were harvested in the West Indies on 5 December and air-freighted to London.. On 10th December they were treated as in Example 1 (except that there were only 40 fruit per treatment) and stored under the conditions of Example 2. Table 3 below shows how they ripened.

TABLE 3

| Treatment No. | Gibberellin (p.p.m.) | Benlate (p.p.m.) | % Green Fruit - Days after Treatment | | | | | |
|---|---|---|---|---|---|---|---|---|
| | | | 35 | 42 | 49 | 56 | 63 | 70 |
| 1 | — | 250 | 92 | 85 | 73 | 15 | 13 | 2 |
| 2 | $A_4/A_7$(10) | 250 | | 95 | 70 | 37 | 15 | 2 |
| 3 | $A_4$ (5) | 250 | | 98 | 73 | 25 | 15 | 10 |
| 4 | $A_7$ (5) | 250 | | 95 | 88 | 55 | 33 | 18 |

All bananas in this Example were treated with benomyl; those which were treated also with gibberellins show about a week's delay in ripening five weeks after treatment.

We claim:

1. A method of improving the storage characteristics of bananas which comprises contacting harvested bananas with gibberellin $A_4$ or gibberellin $A_7$ in an amount sufficient substantially to delay the ripening thereof.

2. The method of claim 1 wherein a mixture of gibberellins $A_4$ and $A_7$ is used.

3. The method of claim 1 wherein the gibberellin is applied in an aqueous formulation containing 0.1 to 30 ppm gibberellin.

4. The method of claim 3 wherein the formulation contains from 1 to 10 ppm gibberellin.

5. The method of claim 1 wherein the bananas are contacted within three days of harvest.

6. The method of claim 5 wherein the bananas are treated within 24 hours of harvest.

7. The method of claim 1 wherein the harvested bananas are also contacted with a fungicide effective in combating fruit rots.

8. The method of claim 7 wherein the fungicide is benomyl.

* * * * *